US007625613B2

(12) United States Patent
Phillips et al.

(10) Patent No.: US 7,625,613 B2
(45) Date of Patent: Dec. 1, 2009

(54) COPY-RESISTANT SECURITY PAPER

(75) Inventors: George K. Phillips, Paso Robles, CA (US); Noal Phillips, Paso Robles, CA (US)

(73) Assignee: Verify First Technologies, Inc., Paso Robles, CA (US)

( * ) Notice: Subject to any disclaimer, the term of this patent is extended or adjusted under 35 U.S.C. 154(b) by 1361 days.

(21) Appl. No.: 10/686,758

(22) Filed: Oct. 15, 2003

(65) Prior Publication Data

US 2005/0086482 A1 Apr. 21, 2005

(51) Int. Cl.
*B44F 1/10* (2006.01)
*B32B 9/04* (2006.01)

(52) U.S. Cl. ...................... 428/29; 428/220; 428/411.1; 427/146; 283/72; 283/94

(58) Field of Classification Search .................. 428/29, 428/195.1, 220, 411.1; 427/146; 283/72, 283/94
See application file for complete search history.

(56) References Cited

U.S. PATENT DOCUMENTS

| | | | |
|---|---|---|---|
| 4,168,088 | A | 9/1979 | Somlyody |
| 4,227,719 | A | 10/1980 | McElligott et al. |
| 4,310,180 | A | 1/1982 | Mowry, Jr. et al. |
| 4,552,617 | A | 11/1985 | Crane |
| 5,018,767 | A | 5/1991 | Wicker |
| 5,171,040 | A | 12/1992 | Orndorff |
| 5,193,853 | A | 3/1993 | Wicker |
| 5,344,192 | A | 9/1994 | Phillips |
| 5,375,886 | A | 12/1994 | Tsuchiya |
| 5,479,507 | A | 12/1995 | Anderson |
| 5,481,378 | A | 1/1996 | Sugano et al. |
| 5,568,248 | A | 10/1996 | Wagley |
| 5,695,220 | A | 12/1997 | Phillips |
| 5,704,651 | A | 1/1998 | Phillips |
| 5,762,378 | A | 6/1998 | Phillips |
| 5,772,248 | A | 6/1998 | Phillips |
| 5,795,643 | A | 8/1998 | Steininger et al. |
| 5,807,625 | A | 9/1998 | Amon et al. |
| 5,826,916 | A | 10/1998 | Phillips |
| 5,830,609 | A | 11/1998 | Warner et al. |
| 5,843,564 | A | 12/1998 | Gasper et al. |
| 5,853,197 | A | 12/1998 | Mowry, Jr. et al. |
| 5,873,604 | A | 2/1999 | Phillips |
| 5,924,737 | A | 7/1999 | Schrupp |
| 5,951,055 | A | 9/1999 | Mowry, Jr. |
| 5,954,368 | A | 9/1999 | Mowry, Jr. |
| 6,000,728 | A | 12/1999 | Mowry, Jr. |
| 6,030,691 | A | 2/2000 | Burchard et al. |
| 6,038,016 | A | 3/2000 | Jung et al. |
| 6,062,604 | A | 5/2000 | Taylor et al. |
| 6,095,425 | A | 8/2000 | Mowry, Jr. |
| 6,104,812 | A | 8/2000 | Koltai et al. |
| 6,171,734 | B1 | 1/2001 | Warner et al. |
| 6,301,363 | B1 | 10/2001 | Mowry, Jr. |
| 6,394,358 | B1 | 5/2002 | Thaxton et al. |
| 6,481,753 | B2 | 11/2002 | Van Boom et al. |
| 6,692,030 | B1 | 2/2004 | Phillips |
| 2002/0012447 | A1 | 1/2002 | Amidror et al. |
| 2002/0176114 | A1 | 11/2002 | Zeller et al. |

FOREIGN PATENT DOCUMENTS

| | | |
|---|---|---|
| WO | WO 97/31784 | 9/1997 |
| WO | WO 99/48700 | 9/1999 |

*Primary Examiner*—David R Sample
*Assistant Examiner*—Lawrence D Ferguson
(74) *Attorney, Agent, or Firm*—Vista IP Law Group LLP

(57) ABSTRACT

A copy-resistant document is provided. The document comprises a substrate, a light reflective layer disposed over the substrate, a light diffusive layer disposed over the reflective layer, and bearer information overprinted on the reflective and diffusive layers. The diffusive layer has a diffusive background pattern that segments the reflective layer into a reflective background pattern comprising a plurality of reflective elements that interfere with the bearer information on a copy of the document. As a result, the diffusive background pattern allows the bearer information to become more readable on the document original by providing contrast to the bearer information and reducing the glare from light reflected from the reflective layer, while the reflective background pattern renders the bearer information unreadable on the document copy.

37 Claims, 7 Drawing Sheets

COPY-RESISTANT SECURITY PAPER

FIELD OF THE INVENTION

The present invention pertains to copy-resistant security paper, and in particular, paper that renders text and/or graphics overprinted on the security paper unreadable when photocopied.

BACKGROUND OF THE INVENTION

Unauthorized copying of sensitive information has occurred since man has been storing and tracking information on documents. Combating document fraud and protecting printed content is a multi-disciplinary and international concern. The constant improvement of modern scanners with digital signal processing means and color copiers has made it economically feasible to reproduce almost perfect reproductions of currency and fraudulent travel documents. This same technology is now used everyday to easily copy printed information for nefarious reasons.

Many different security printing techniques have been developed to alert a casual observer of a fraud attempt at the time of general inspection. We refer to these technologies in general terms as "copy evident." While these "copy evident" techniques provide some level of warning on a copy, they do not prevent someone from identifying, copying, and sharing valuable private and confidential information.

One known technique of inhibiting unauthorized copying of original documents utilizes a metallized reflective substrate on which information can be printed. When the original document is photocopied, the reflective surface of the substrate induces a predominantly black and illegible copy. In particular, the reflective surface, which forms a background for the printed information, provides a corresponding black copy background, thereby making the printed information unreadable on the document copy. Unfortunately, today's photocopiers can be manipulated to at least partially produce printed images on metallic surfaces. In addition, since incident light reflects off a polished smooth surface on a parallel plane, the mere use of a highly reflective metallic background to protect highly absorbent printed information does not effectively work with diffused photocopy devices, which capture diffused light rays. Also, the reflective substrate surface creates a high gloss or glare that provides poor contrast, thereby making it difficult to read the information on the original document and contributing to eye fatigue when reading the information.

In order to improve the security of such documents and to improve the readability of such information, it is known to provide a partially transparent screen, which is formed by randomly printing light absorbing elements over the reflective substrate. As a result, the randomly printed screen reduces the glare from the reflective substrate to provide the necessary contrast between the information and the reflective substrate. The randomly printed screen also provides a light absorption and diffraction phenomenon that, when printed in correct density and contrast, turns a photocopy of the document predominantly black.

Although the use of a randomly printed screen reduces the glare from a reflective substrate surface, which would otherwise render the information printed on the document difficult to read, this screen must be printed very dark to ensure that a resulting document copy is unreadable. Thus, the information on the original document may still be difficult to read to some extent. In essence, the readability of the information on the original document must be balanced against the security that the document provides against unauthorized copying. That is, as the screen is printed darker, document security is increased, but readability of the information on the original document is decreased. As the screen is printed lighter, the readability of the information on the original is increased, but the document security is decreased.

There, thus, remains a need to provide a document that is more readable when viewing an original of the document, yet prevents or, at the least, deters copying of information contained on such document.

SUMMARY OF THE INVENTION

In accordance with the prevent invention, a copy-resistant document is provided. The security document comprises a substrate, a light reflective layer disposed over at least a portion of the substrate, a light diffusive layer disposed over at least a portion of the reflective layer, and bearer information (e.g., alphanumerical characters, graphics, pictures, or geographical map lines) overprinted on the combination of the reflective and diffusive layers. It should be noted that any one of a variety of other layers can be placed between the substrate, diffusive and reflective layers, and bearer information without straying from the principles taught by this invention. The significance is that the required document layers be overlaid in a certain order with respect to each other regardless of any intervening layers that may exist.

The substrate may be composed of a suitable material, such as paper. Other types of printable substrate materials can of course be used, e.g., plastic. The bearer information is preferably printed in a standard ink or toner, such as that used in standard office printers and copiers. Thus, bearer information can be overprinted over the substrate in a typical office or home environment to form the original document, which can be read, whereas the bearer information will not be easily readable on a photocopy of the document due to its interaction with the reflective layer.

The reflective layer is composed of a suitable material, such as metal, and preferably exhibits a relatively high spectral reflectance, e.g., at least eighty percent. In this manner, any portion or the reflective layer exposed to light during a photocopying process will form a corresponding blackened image on the document copy, thereby rendering the bearer information difficult to read on a document copy. In the preferred embodiment, the reflective layer is disposed over the entirety of the substrate to provide maximum security, but can alternatively be disposed over a portion of the substrate to provide security only to that portion. To render the overprinted bearer information more readable on the document original, the reflective layer, in the preferred embodiment, is non-black, so that bearer information, which is typically printed in black ink, can be more easily read on an original document.

The diffusive layer serves to reduce the glare from light reflected from the reflective surface, thereby making the bearer information more readable, while preserving the reflective properties of the reflective layer necessary to render the bearer information difficult to read on a document copy. In particular, the background layer has a diffusive background pattern that serves to segment the reflective layer into a reflective background pattern having a plurality of reflective elements. In accordance with a first aspect of the present invention, the reflective elements are visibly discernible from the viewpoint of a reader of the document (e.g., at least 6-point font size), so that reflective elements may visibly and beneficially interfere with the visible elements of the bearer information when the document is photocopied.

In the preferred embodiment, the diffusive background elements are arranged, such that the geometry of the reflective background elements matches the general geometry of the bearer information intended to be printed and protected on the substrate. For example, if the intended bearer information comprises alphanumerical characters, the diffusive layer can be designed and printed to make the reflective elements appear as a pattern of vertical and horizontal rectilinear elements or a random pattern of alphanumerical characters. Or, if the intended bearer information are curved lines, such as those found in a geographical map, the diffusive layer can be designed and printed to make the reflective elements appear as a random pattern of curvilinear elements. Thus, the reflective elements, when copied, will turn black on the document copy, making the overprinted indicial difficult to distinguish from the blacked image of the reflective elements, and thus unreadable, or at least difficult to read. The design and size of the reflective elements also preferably matches the size of the bearer information. For example, if the overprinted indicia has a 10-point font size, each reflective element also preferably has approximately a 10-point font size.

In accordance with another aspect of the present invention, the diffusive layer also serves to provide greater contrast for the bearer information. In particular, the diffusive background pattern is preferably non-black (e.g., white), so that the bearer information can be more easily distinguished from the diffusive background pattern, and thus, made more readable on an original of the document.

In an optional embodiment, the security document may comprise a plurality of nano-characters that have open areas that fill in on the document copy by trapping printing matter, e.g., ink or toner. In this manner, a document copy can be more easily distinguished from a document original, thereby preventing counterfeiting of the original document. In one preferred embodiment, one or more of the diffusive background elements composes a plurality of nano-characters. In this manner, the density of the diffusive background pattern can be more easily adjusted by adjusting the size and number of the open areas in the nano-characters. In another preferred embodiment, the nano characters can be applied over the diffusive and reflective background patterns to reduce glare caused by light reflecting from the reflective layer, resulting in more readable bearer information on the document original. The nano-characters may further form a hidden message that identifies an aspect of the original document, such as the owner or the document, or the location and/or date of document printing.

BRIEF DESCRIPTION OF THE DRAWINGS

The drawings illustrate the design and utility of preferred embodiment(s) of the present invention, in which similar elements are referred to by common reference numerals. In order to better appreciate the advantages and objects of the present invention, reference should be made to the accompanying drawings that illustrate the preferred embodiment(s). The drawings depict only an embodiment(s) of the invention, and should not be taken as limiting its scope. With this caveat, the preferred embodiment(s) will be described and explained with additional specificity and detail through the use of the accompanying drawings in which.

DETAILED DESCRIPTION OF THE PREFERRED EMBODIMENTS

Figure 1:
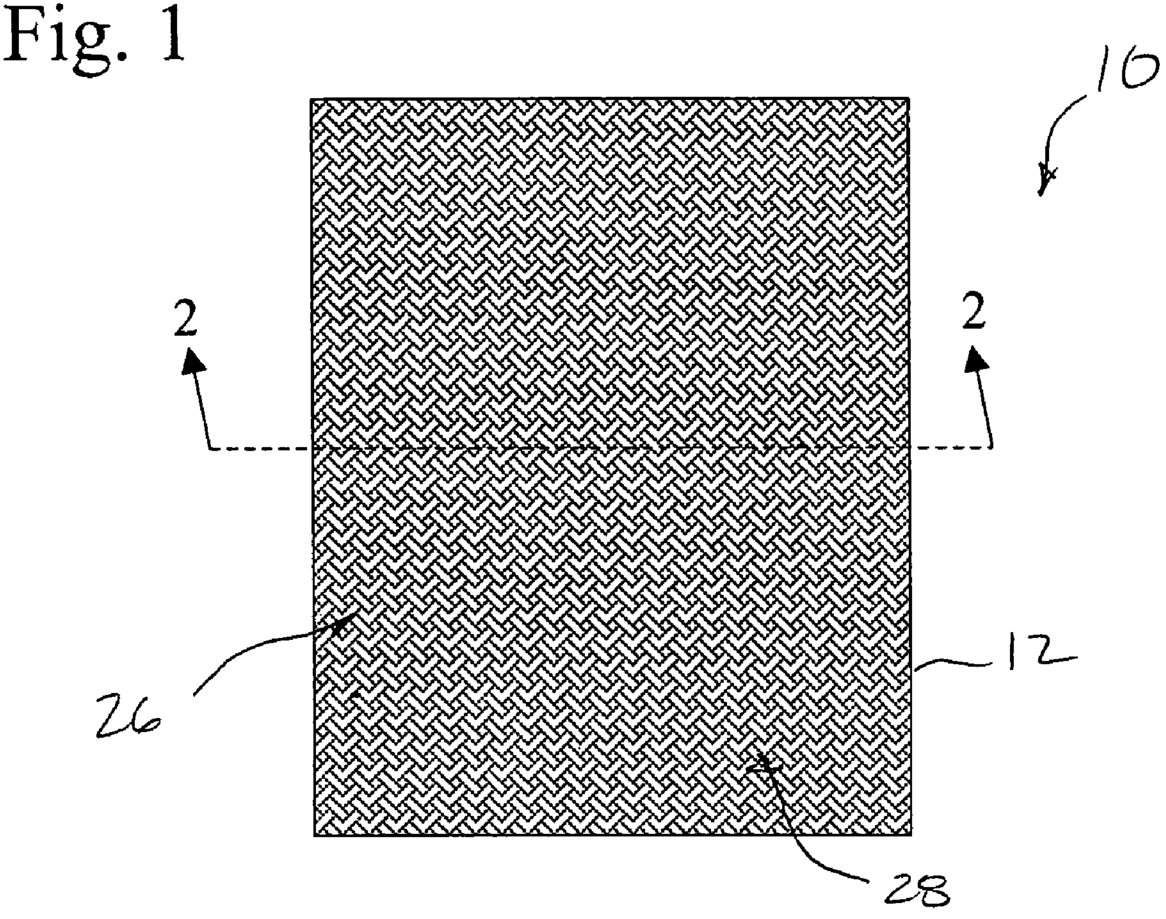
FIG. 1 is a plan view of copy-resistant security paper constructed in accordance with one preferred embodiment of the present invention.
Figure 2:
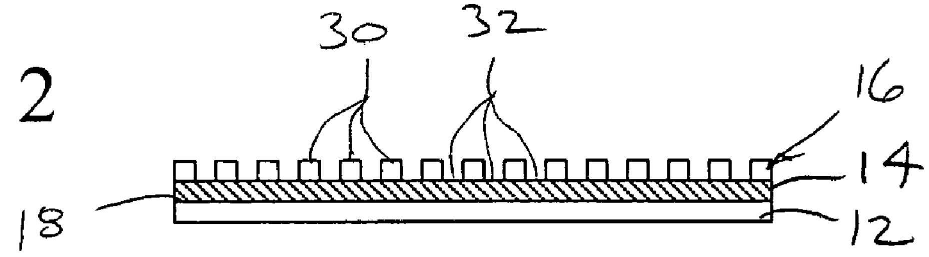
FIG. 2 is a cross-sectional view of the security paper of FIG. 1, taken along the line 2-2.
Figure 3:
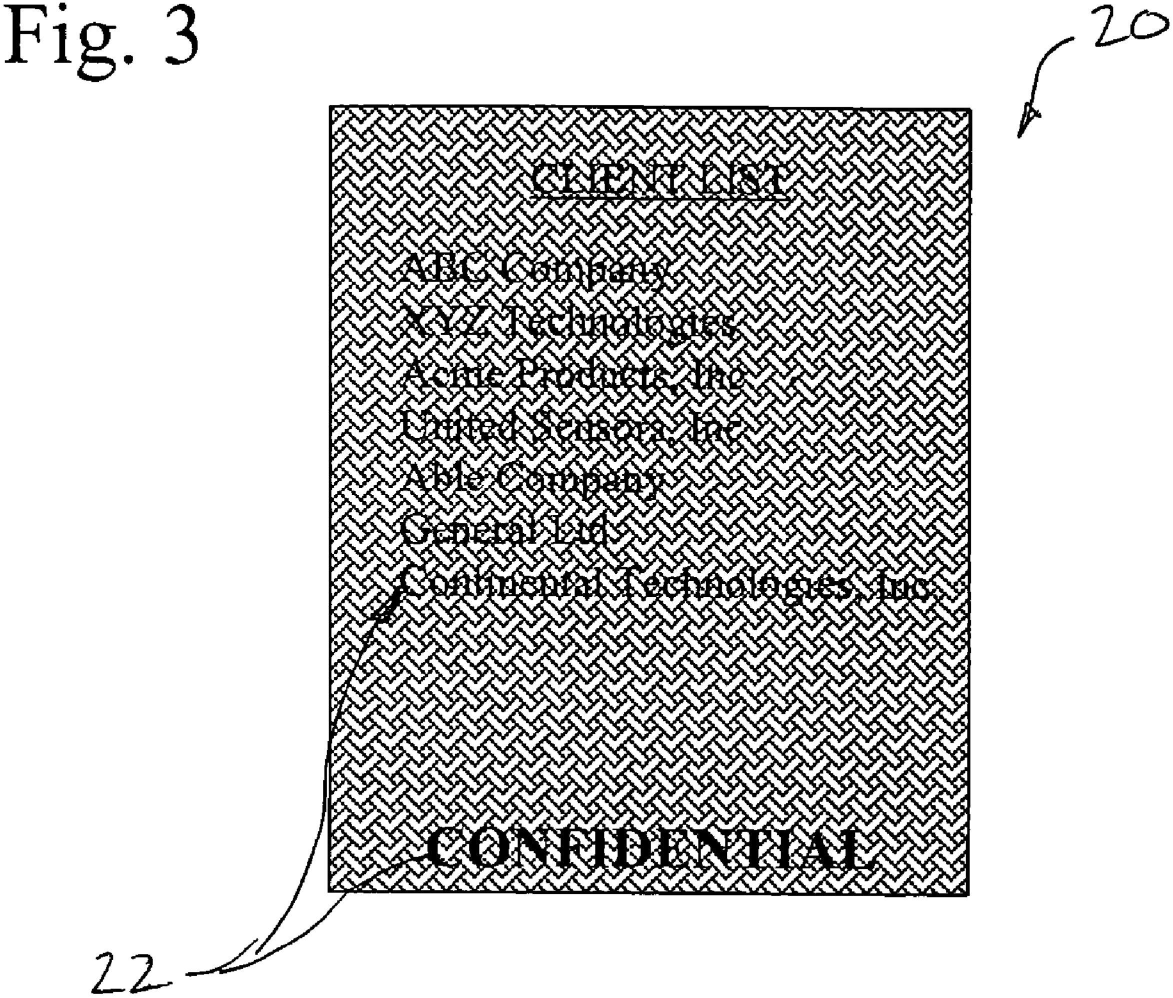
FIG. 3 is a plan view of an original document formed by printing bearer information over the security paper of FIG. 1.

Referring to FIGS. 1 and 2, a preferred embodiment of a sheet of copy-resistant security paper 10 manufactured in accordance with the present invention will now be described. Bearer information 22 (such as, e.g., alphanumerical characters and other information) can be printed on the security paper 10 to create a copy-resistant document 20 (shown in FIG. 3). The security paper 10 comprises a generally planar substrate 12 having a surface 18. The substrate 12 is preferably composed of paper stock, although any material suitable for printing may be used without departing from the scope of the present invention. The substrate 12 can be of any size, but is preferably a conventional size that is compatible with conventional printing technologies, e.g., A4, A5, 8½×11 inch, or 8½×14 inch.

The security paper 10 further comprises several security layers laminated over the surface 18 of the substrate 12, which prevent the bearer information 22 of the document 20 from being copied by conventional black or white or color electrostatic copiers. In the illustrated embodiment, the security layers are applied over the entire surface of the substrate 12. In this manner, the bearer information 22 will be protected from authorized copying independent of where the bearer information 22 is printed on the document. Alternatively, any combination of the security layers may only be applied over specific portions of the printable substrate surface anticipated to carry the bearer information, e.g., the portion of the printable substrate surface circumscribed by a one-inch margin extending around the perimeter of a document or within the top or bottom half of the document.

Thus, it can be appreciated that, while bearer information 22 can be conveniently printed on the security paper 10 using conventional techniques (e.g., feeding the security paper 10 through a laser printer or photocopy machine), the printed bearer information 22 cannot be conveniently reproduced using the same conventional techniques. It is anticipated that the present invention will be particularly suitable for documents on which confidential bearer information is printed, and which the owner or legal possessor of such documents desires to prevent the copying of such confidential information. It should be noted, however, that the present invention is not necessarily so limiting, and can be used to prevent the counterfeiting of graphics, pictures, maps and fraudulent use of documents, such as checks, financial instruments, coupons, or other documents of value.

In the embodiment illustrated in FIG. 1, two security layers are provided: a light reflective layer or coating 14 disposed over the surface 18 of the substrate 12, and a light diffusive layer 16 disposed over the reflective layer 14. The reflective layer 14 provides the substrate 12 with a mirror-like glossy finish. To provide this effect, the reflective layer 14 preferably is very smooth and exhibits at least a eighty percent reflectivity (i.e., at least eighty percent of the light rays incident on the reflective layer 14 is reflected as specular light rays). For example, the reflective layer 14 can be composed of a layer of metal that provides a specular surface, such as, e.g., aluminum, brass, gold, silver, copper, nickel, platinum, or rhodium. The reflective layer 14 can be applied to the surface 18 of the substrate 12 using any one of a number of conventional methods, such as vapor deposition or lamination. Printable substrates with reflective metallic layers can currently be obtained from Vacumet Corporation, located in Morristown, Tenn.

The diffusive layer 16 can be printed on the reflective layer 14 using a conventional UV offset ink, although other types of light-absorbent inks can also be used. Thus, the diffusive layer 16 exhibits a reflectivity that is less than that of the reflective layer 14. The diffusive layer 16 provides the security paper 10 with several beneficial effects.

First, the diffusive layer 16 comprises a diffusive background pattern 26 that causes light reflecting off of the document 20 to be somewhat diffused, thereby reducing the glare from the reflective layer 14 and allowing the bearer information 22 to be more easily readable. Second, the diffusive layer 16 provides contrast for the bearer information 22. In particular, the diffusive layer 16 preferably has a color that differs from that of the bearer information 22. For example, if the bearer information 12 is black, the diffusive layer 16 is preferably white. Third, the diffused reflected light pattern created by the diffusive layer 16 coordinates with the specular reflected light pattern created by the reflective layer 14 to provide an interference light pattern that hinders accurate photo or scanning reproduction of the bearer information 22.

Fourth, and as best shown in FIG. 2, the diffusive background pattern 26 segments the reflective layer 18 into a complementary reflective background pattern 28. Specifically, the diffusive background pattern 26 is formed of a plurality of diffusive elements 30 between which a plurality of reflective elements 32 on the reflective layer 18 is exposed. The reflective elements 26 geometrically and proportionately coordinate with the size and angles of the bearer information 22, such that bearer information 22 on a copy of the document 20 is obliterated. For example, if the bearer information 22 comprises alphanumerical characters of 10-point font size, the visible size of the reflective elements 26 preferably are to designed have a 10-point font size. Thus, when the original document 10 is scanned or photocopied, the reflective background pattern 28 will turn black on a copy of the document 20, such that the bearer information 22 cannot be easily distinguished from the background.

Figure 4:
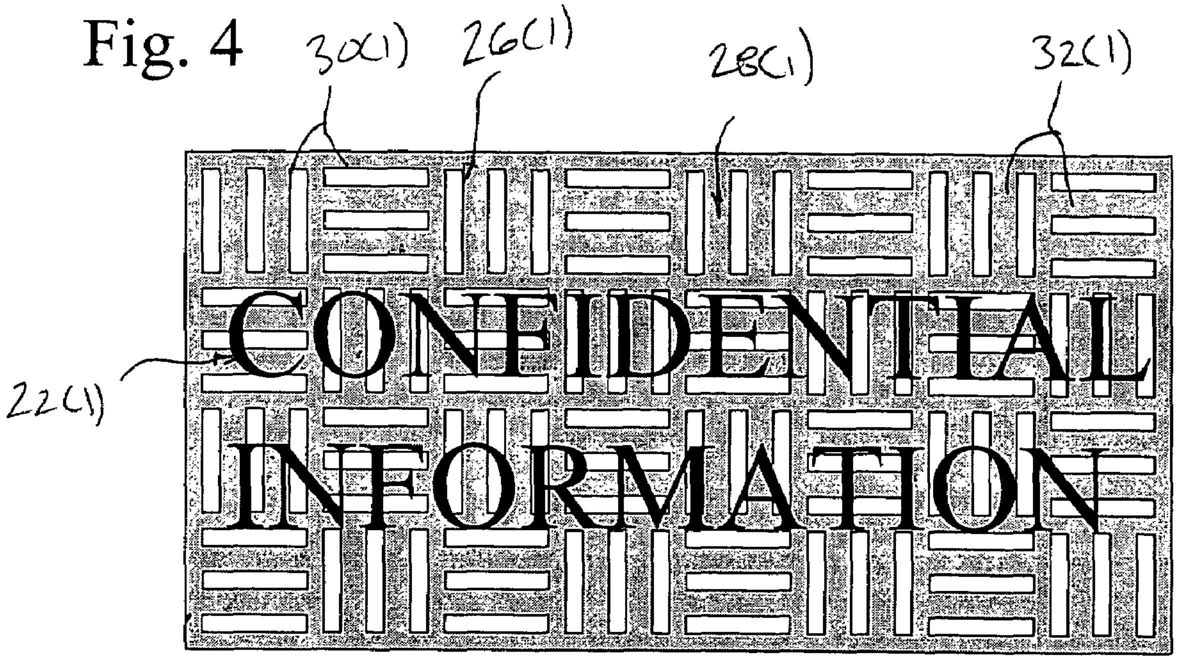
FIG. 4 is a plan view of one preferred diffusive and reflective background pattern combination over which bearer information is printed, as appearing on a document original.
Figure 5:
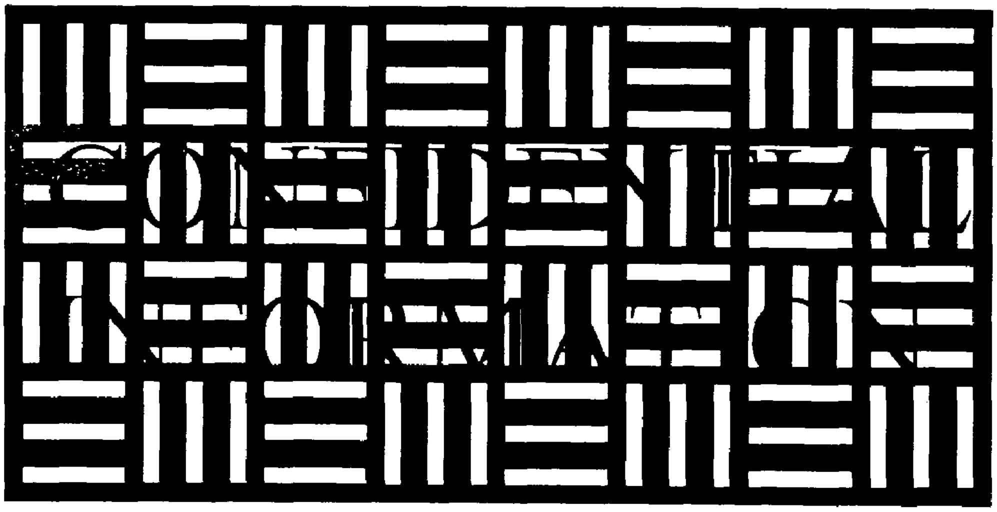
FIG. 5 is a plan view of a photocopy of the diffusive and reflective background pattern combination of FIG. 4, wherein the bearer information is rendered unreadable.

The designed size and geometry of the diffusive elements 30, and thus, the size and geometry of the complementary reflective elements 26, will depend on the nature of the bearer information 22. For example, FIG. 4 illustrates a diffusive background pattern 26(1) on which bearer information 22(1) is printed. As can be seen, the diffusive background pattern 26(1) comprises an alternating pattern of equally spaced horizontal and vertical rectilinear background segments 30(1). It has been found that the pattern of rectilinear background elements 30(1) illustrated in FIG. 4 provides sufficient camouflage for alphanumerical characters, such as those contained in the bearer information 22(1), which contain many rectilinear elements. Thus, as illustrated in FIG. 5, the bearer information 22(1) will not be easily distinguishable from the blackened image of the complementary reflective background elements 32(1) on a photocopy.

Figure 6:
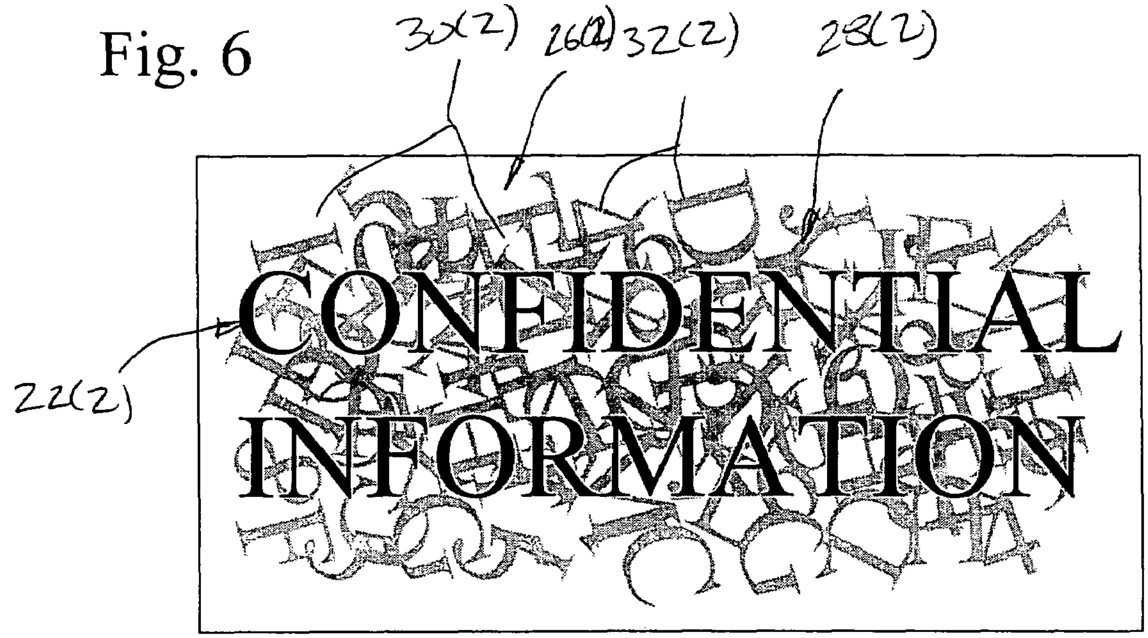
FIG. 6 is a plan view of another preferred diffusive and reflective background pattern combination over which bearer information is printed, as appearing on a document original.
Figure 7:
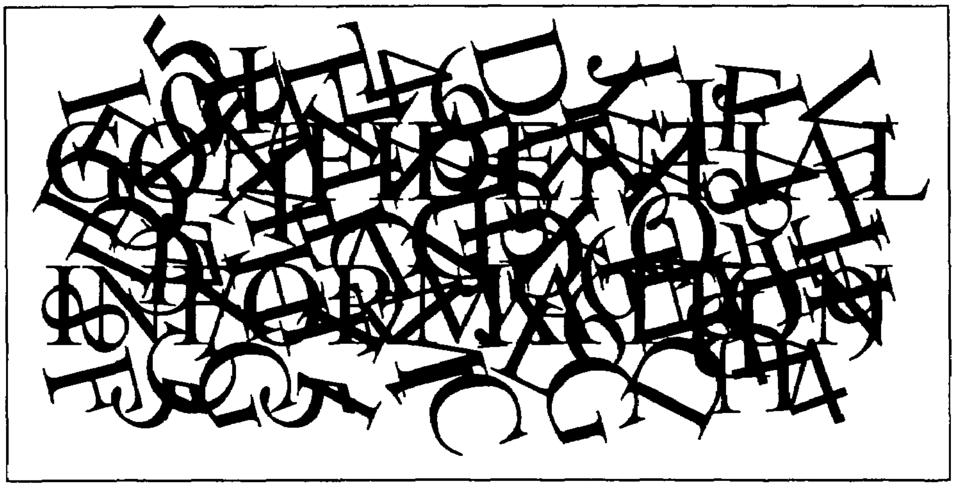
FIG. 7 is a plan view of a photocopy of the diffusive and reflective background pattern combination of FIG. 6, wherein the bearer information is rendered unreadable.

As another example, FIG. 6 illustrates another diffusive background pattern 26(2) on which bearer information 22(2) is printed. As can be seen, the diffusive background pattern 26(2) comprises a pattern of background elements 30(2) that form a complementary pattern of reflective elements 32(2) randomly arranged as alphanumerical characters. The bearer information 22(2) font, graphics, and design are preferably selected so that the text is approximately the same size and general design as the alphanumerical reflective elements 32(2) used to form the reflective pattern 28(2). As a result, the alphanumerical bearer information 22(2) will be camouflaged by the alphanumerical reflective elements 32(2). Thus, as illustrated in FIG. 7, the bearer information 22(2) will not be easily distinguishable from the blackened image of the complementary reflective background elements 32(2) on a photocopy.

Figure 8:
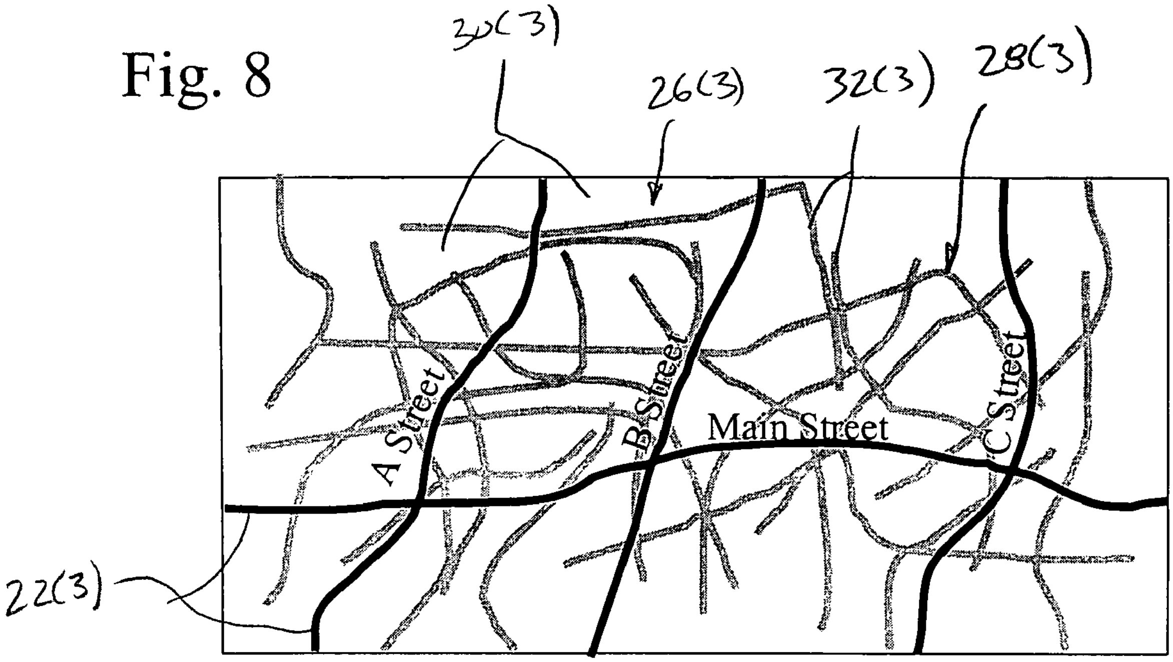
FIG. 8 is a plan view of still another preferred diffusive and reflective background pattern combination over which bearer information is printed, as appearing on a document original.
Figure 9:
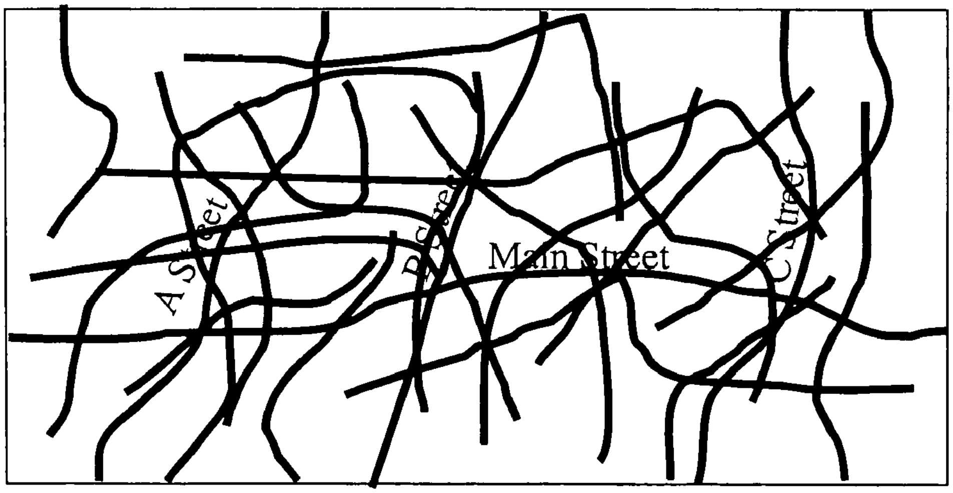
FIG. 9 is a plan view of a photocopy of the diffusive and reflective background pattern combination of FIG. 8, wherein the bearer information is rendered unreadable.

As still another example, FIG. 8 illustrates another diffusive background pattern 26(3) on which bearer information 22(3) is printed. As can be seen, the diffusive background pattern 26(3) comprises a pattern of background elements 30(3) that form a complementary pattern of randomly arranged curvilinear reflective elements 32(3). In this case, the bearer information 22(3) exhibits a curvilinear nature. Specifically, the bearer information comprises roads on a geographical map. As a result, the curvilinear bearer information 22(3) will be camouflaged by the curvilinear reflective elements 32(3). Thus, as illustrated in FIG. 9, the bearer information 22(3) will not be easily distinguishable from the blackened image of the complementary reflective background elements 32(3) on a photocopy.

Figure 10:
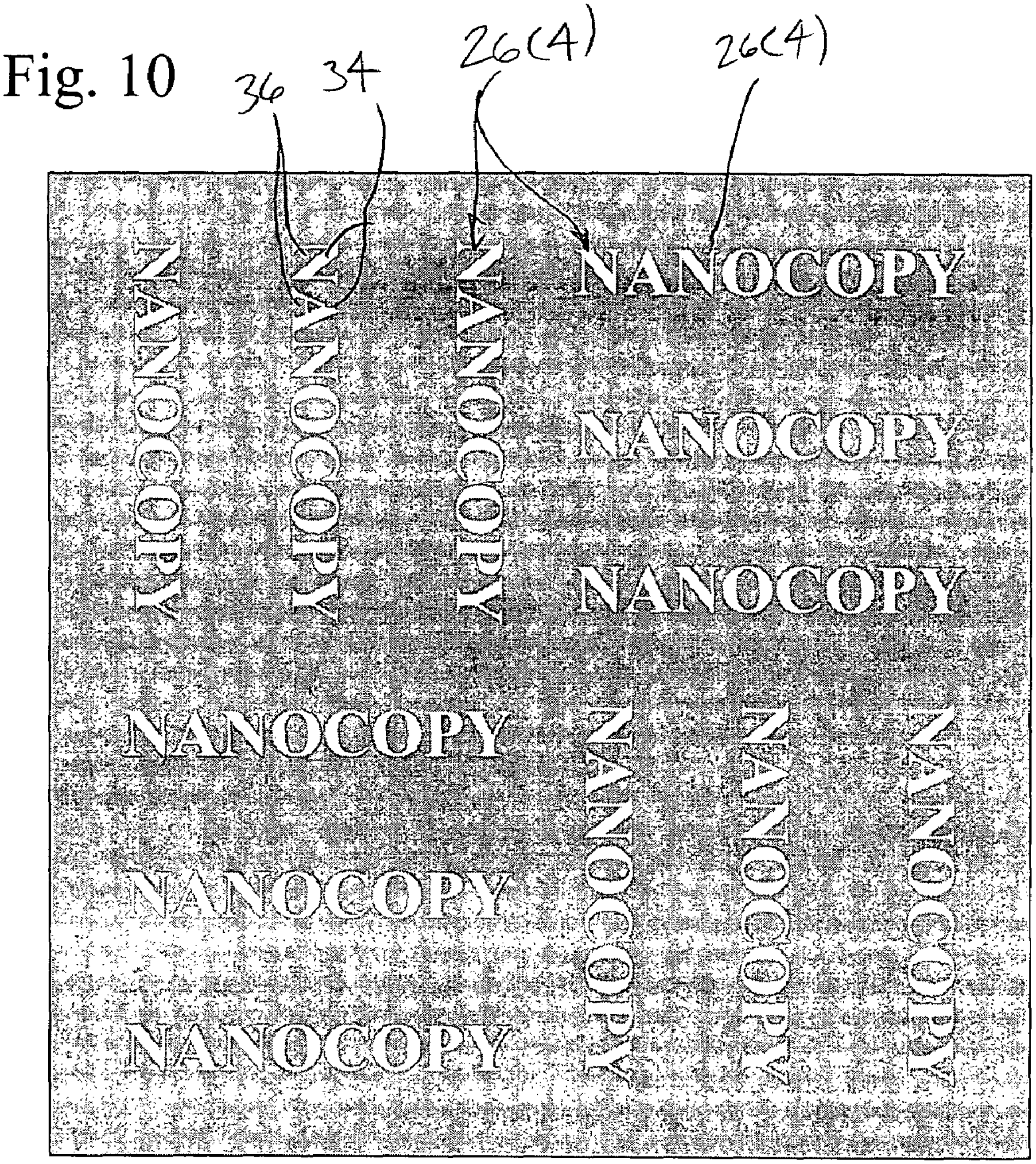
FIG. 10 is close-up plan view of a diffusive and reflective background pattern combination, wherein the diffusive background elements are composed of nano-characters.

As shown in FIGS. 4, 6, and 8, each of the diffusive background elements 30 are formed of a solid white element. It should be noted, however, that a diffusive element 30 can be formed of a plurality of nano-characters, rather than a solid element. For example, FIG. 10 illustrates a diffusive background pattern 26(4) that is similar to the background pattern 26(1) illustrated in FIG. 4, with the exception that each background element 26(4) comprises a plurality of nano-characters 34. The use of nano-characters 34 allows the background pattern 26 to be more easily printed at different colors or visual densities. That is, the nano-characters 34 comprise open areas 36 through which specular light reflects. Thus, if greater copying security is desired, the visual density of the diffusive background pattern 26(4) can be decreased by increasing the number and/or size of the open areas 36. In contrast, if greater readability is desired, the visual density of the diffusive background pattern 26(4) can be increased by decreasing the number and/or size of the open areas 36.

The use of nano-characters 34 also provides a means for identifying the document 10 as being original, since the nano-characters 34 are virtually impossible to replicate on a photocopy machine. That is, when viewing an original of the document 10 with a magnifying glass or other visual enhancement device, the nano-characters 34 can be verified by the reader to determine if the document 10 is an original or photocopy. When the document 10 is photocopied, however, the open areas 36 of the nano-characters 34 will tend to fill in (i.e., they will trap ink or toner) on a copy of the document 20, thereby rendering the nano-characters 34 unreadable, or at least modifying the nano-characters 34 enough to alert the reader that he or she is holding a copy of the document 20. Optionally, the nano-characters 24 may be combined to form a repeating hidden message that identifies some aspect of the original document, such as, e.g., the owner of the original document, or the location or date of printing. Further details regarding the use of nano-characters to provide security features to original documents are disclosed in U.S. patent application Ser. No. 09/621,325, which is expressly incorporated herein by reference.

Figure 11:
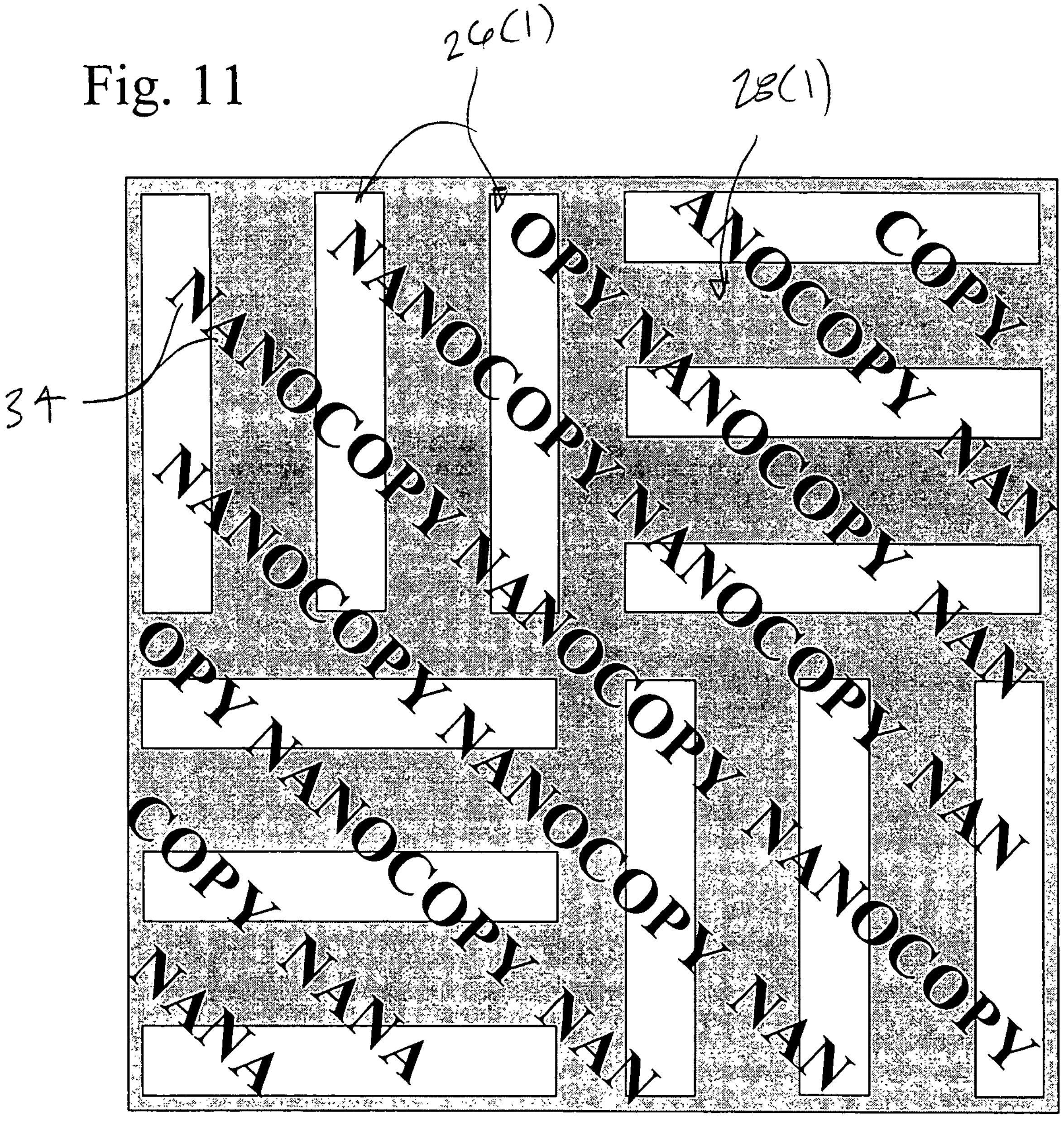
FIG. 11 is close-up plan view of a diffusive and reflective background pattern combination over which a layer of nano-characters is disposed.

Rather than forming the diffusive background pattern 26 out of nano-characters 34, a separate layer of diffusive nano-characters 34 can be applied to the original document 10, as illustrated in FIG. 11. In this case, the nano-characters 34, which are formed over the reflective background pattern 28(1), as well as the diffusive background pattern 26(1), decreases the glare of the light reflection from the reflective background pattern 28, thereby rendering any bearer information on the original document more readable. Notably, the nano-characters 34 in this case are black, which of course cause a corresponding image of the nano-characters 34 to be black on a document copy, thereby minimizing the readability of any photocopied bearer information. The color of the nano-characters 34 can also be used to tint the reflective layer 14 to a color that provides greater contrast for readability of the document original (assuming that the bearer information 18 is black), e.g., gray, blue, pink, or green. As previously described, the nano-characters 34 can also provide an additional level of document security by allowing a document original to be distinguished from a document copy.

Although particular embodiments of the present invention have been shown and described, it should be understood that the above discussion is not intended to limit the present invention to these embodiments. Those of ordinary skill in the art will appreciate that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A copy-resistant security sheet, comprising:
- a substrate;
- a light reflective layer disposed over the substrate; and
- a light diffusive layer disposed over at least a portion of the reflective layer, the diffusive layer having a diffusive background pattern segmenting the reflective layer into a reflective background pattern comprising a plurality of visibly discernible reflective elements;
- wherein, when bearer information is overprinted on the reflective and diffusive layers, the reflective elements are configured for interfering with the bearer information on a copy of the document, thereby rendering the bearer information unreadable on the document copy.

2. The security sheet of claim 1, wherein the reflective layer is composed of metal.

3. The security sheet of claim 1, wherein the reflective layer exhibits a reflectance of at least eighty percent.

4. The security sheet of claim 1, wherein the reflective layer is disposed over the entirety of the substrate.

5. The security sheet of claim 1, wherein the diffusive background pattern is non-black.

6. The security sheet of claim 1, wherein the diffusive background pattern is white.

7. The security sheet of claim 1, wherein at least a portion of the diffusive background pattern is composed of a plurality of nano-characters.

8. The security sheet of claim 1, wherein the reflective elements have at least a 6 point font size.

9. The document of claim 1, wherein the reflective elements are configured for allowing the bearer information to be readable on an original of the document.

10. The document of claim 1, wherein, when bearer information is overprinted on the reflective and diffusive layers using toner or ink, the reflective elements are configured for interfering with the bearer information on the document copy, thereby rendering the bearer information unreadable on the document copy.

11. A copy-resistant document, comprising:
- a substrate;
- a light reflective layer disposed over the substrate;
- a light diffusive layer disposed over at least a portion of the reflective layer, the diffusive layer having a diffusive background pattern segmenting the reflective layer into a reflective background pattern comprising a plurality of visibly discernible reflective elements; and
- bearer information overprinted on the reflective and diffusive layers, wherein the reflective elements interfere with the bearer information on a copy of the document, thereby rendering the bearer information unreadable on the document copy.

12. The document of claim 11, wherein the bearer information comprises alphanumerical characters.

13. The document of claim 12, wherein the alphanumerical characters and the reflective elements have a substantially similar font size.

14. The document of claim 11, wherein the bearer information is black, and the diffusive background pattern is non-black.

15. The document of claim 14, wherein the diffusive background pattern is white.

16. The document of claim 11, wherein the reflective elements are configured for allowing the bearer information to be readable on an original of the document.

17. The document of claim 16, wherein the reflective elements are configured for allowing the bearer information to be readable on an original of the document at any viewing angle.

18. The document of claim 11, wherein the bearer information is overprinted on the reflective and diffusive layers using toner or ink.

19. A copy-resistant security sheet, comprising:
- a substrate;
- a light reflective layer disposed over the substrate; and
- a light diffusive layer disposed over at least a portion of the reflective layer, the diffusive layer having a non-black diffusive background pattern segmenting the reflective layer into a reflective background pattern comprising a plurality of reflective elements;
- wherein, when bearer information is overprinted on the reflective and diffusive layers, the reflective elements are configured for interfering with the bearer information on a copy of the document, thereby rendering the bearer information unreadable on the document copy.

20. The security sheet of claim 19, wherein the reflective layer is composed of metal.

21. The security sheet of claim 19, wherein the reflective layer exhibits a reflectance of at least eighty percent.

22. The security sheet of claim 19, wherein the reflective layer is disposed over the entirety of the substrate.

23. The security sheet of claim 19, wherein the diffusive background pattern is white.

24. The security sheet of claim 19, wherein at least a portion of the diffusive background pattern is composed of a plurality of nano-characters.

25. The security sheet of claim 19, wherein the reflective elements have at least a 6 point font size.

26. The document of claim 19, wherein the reflective elements are configured for allowing the bearer information to be readable on an original of the document.

27. The document of claim 26, wherein the reflective elements are configured for allowing the bearer information to be readable on an original of the document at any viewing angle.

28. The document of claim 19, wherein, when bearer information is overprinted on the reflective and diffusive layers using toner or ink, the reflective elements are configured for interfering with the bearer information on the document copy, thereby rendering the bearer information unreadable on the document copy.

29. A copy-resistant document, comprising:

a substrate;

a light reflective layer disposed over the substrate;

a light diffusive layer disposed over at least a portion of the reflective layer, the diffusive layer having a non-black diffusive background pattern segmenting the reflective layer into a reflective background pattern comprising a plurality of reflective elements; and bearer information overprinted over the reflective and diffusive layers, wherein the reflective elements interfere with the bearer information on a copy of the document, thereby rendering the bearer information unreadable on the document copy.

30. The document of claim 29, wherein the bearer information comprises alphanumerical characters.

31. The document of claim 30, wherein the alphanumerical characters and the reflective elements have a substantially similar font size.

32. The document of claim 29, wherein the bearer information is black, and the diffusive background pattern is non-black.

33. The document of claim 32, wherein the diffusive background pattern is white.

34. The document of claim 9, wherein the reflective elements are configured for allowing the bearer information to be readable on an original of the document at any viewing angle.

35. The document of claim 29, wherein the reflective elements are configured for allowing the bearer information to be readable on an original of the document.

36. The document of claim 35, wherein the reflective elements are configured for allowing the bearer information to be readable on an original of the document at any viewing angle.

37. The document of claim 29, wherein the bearer information is overprinted on the reflective and diffusive layers using toner or ink.

* * * * *